United States Patent
Kobayashi et al.

(10) Patent No.: US 12,490,911 B2
(45) Date of Patent: Dec. 9, 2025

(54) SPHYGMOMANOMETER

(71) Applicant: OMRON HEALTHCARE CO., LTD., Muko (JP)

(72) Inventors: Tatsuya Kobayashi, Kyoto (JP); Hideyuki Yamashita, Kyoto (JP); Maya Makita, Kyoto (JP)

(73) Assignee: OMRON HEALTHCARE CO., LTD., Muko (JP)

( * ) Notice: Subject to any disclaimer, the term of this patent is extended or adjusted under 35 U.S.C. 154(b) by 473 days.

(21) Appl. No.: 18/117,693

(22) Filed: Mar. 6, 2023

(65) Prior Publication Data

US 2023/0200669 A1 Jun. 29, 2023

Related U.S. Application Data

(63) Continuation of application No. PCT/JP2021/040363, filed on Nov. 2, 2021.

(30) Foreign Application Priority Data

Nov. 6, 2020 (JP) ................. 2020-186052

(51) Int. Cl.
*A61B 5/022* (2006.01)
*A61B 5/00* (2006.01)
(Continued)

(52) U.S. Cl.
CPC ...... *A61B 5/02233* (2013.01); *A61B 5/02141* (2013.01); *A61B 5/6824* (2013.01)

(58) Field of Classification Search
CPC ............ A61B 5/02233; A61B 5/02141; A61B 5/6824; A61B 5/489; A61B 5/0261; A61B 5/681; A61B 5/022; A61B 5/1171
See application file for complete search history.

(56) References Cited

U.S. PATENT DOCUMENTS 8,888,714 B1 * 11/2014 Soto ................... A61B 5/15003
600/576
2015/0356339 A1 12/2015 Demos
(Continued)

FOREIGN PATENT DOCUMENTS

AU 2019249818 A1 10/2020
CN 202723841 U 2/2013
(Continued)

OTHER PUBLICATIONS

JP2007190272A—Google Patents translation (Year: 2007).*
(Continued)

*Primary Examiner* — Justin Xu
(74) *Attorney, Agent, or Firm* — Oliff PLC

(57) ABSTRACT

In the present invention, a blood pressure measuring cuff is worn around a rod-shaped site to be measured of a subject in a circumferential direction. A light projecting unit is disposed only along an edge portion on one side or both sides of the cuff in a width direction, and irradiates a periphery of a target region of the site to be measured with light. A light receiving unit is provided in a sheet shape along a specific portion facing the target region on an inner surface of the cuff, and receives light scattered or reflected by the target region to obtain an image including a vein pattern of the target region. An authentication unit compares the vein pattern with a reference vein pattern registered in advance, and performs the vein authentication on the subject.

7 Claims, 10 Drawing Sheets

(51) Int. Cl.
    *A61B 5/021*     (2006.01)
    *A61B 5/026*     (2006.01)
    *A61B 5/1171*    (2016.01)

(56) References Cited

U.S. PATENT DOCUMENTS

| | | | |
|---|---|---|---|
| 2016/0321951 A1 | 11/2016 | Kim et al. | |
| 2017/0325825 A1* | 11/2017 | Bybordi | A61B 5/150748 |
| 2019/0089539 A1 | 3/2019 | Dupont | |

FOREIGN PATENT DOCUMENTS

| | | | | |
|---|---|---|---|---|
| CN | 108388782 | A | 8/2018 | |
| CN | 208492052 | U | 2/2019 | |
| CN | 110113992 | A | 8/2019 | |
| JP | 2001-309895 | A | 11/2001 | |
| JP | 2006-11711 | A | 1/2006 | |
| JP | 2006-217930 | A | 8/2006 | |
| JP | 2007190272 | A * | 8/2007 | |
| JP | 2007-325842 | A | 12/2007 | |
| JP | 6027716 | B2 | 11/2016 | |
| JP | 2017-000415 | A | 1/2017 | |
| JP | 2017-510411 | A | 4/2017 | |
| JP | 2018-99177 | A | 6/2018 | |
| JP | 2018-102818 | A | 7/2018 | |
| JP | 3223156 | U | 9/2019 | |
| JP | 2020-142070 | A | 9/2020 | |
| WO | 2012/127884 | A1 | 9/2012 | |
| WO | WO-2017003078 | A1 * | 1/2017 | G06V 40/14 |
| WO | WO-2018235655 | A1 * | 12/2018 | G16H 40/63 |
| WO | 2020/195300 | A1 | 10/2020 | |

OTHER PUBLICATIONS

WO2017003078A1—Google Patents translation (Year: 2017).*
WO2018235655A1—Google patents translation (Year: 2018).*
Apr. 25, 2025 Office Action issued in Chinese Patent Application No. 202180054624.X.
Jan. 18, 2022 International Search Report issued in International Patent Application No. PCT/JP2021/040363.
Sep. 15, 2025 Examination Report issued in Indian Patent Application No. 202317014793.
Sep. 30, 2025 Office Action issued in Brazilian Patent Application No. BR112023004307-7.

* cited by examiner

SPHYGMOMANOMETER

CROSS-REFERENCE TO RELATED APPLICATION

This application is based on an application No. 2020-186052 filed in Japan on Nov. 6, 2020, the entire content of which is hereby incorporated by reference.

TECHNICAL FIELD

The present invention relates to a sphygmomanometer, and more particularly to a sphygmomanometer having a vein authentication function.

BACKGROUND ART

Conventionally, as a device having a vein authentication function and a blood pressure measurement function, for example, as disclosed in Patent Literature 1 (JP 6027716 B2), a device having a wristwatch-type shape, which includes a belt portion worn around a wrist of a user (subject) and a housing portion integrally formed with the belt portion, is known. In the housing portion, a light projecting opening and a light receiving opening are formed on a contact surface in contact with the skin of the user. Furthermore, the housing portion is mounted with a light projecting unit that projects light in a direction of the skin through the light projecting opening, a light receiving unit that receives reflected light of the projected light through the light receiving opening, an authentication unit that generates a current vein pattern from an amount of received reflected light and compares the vein pattern with a reference vein pattern (original vein pattern) registered in advance to perform vein authentication, and a relative blood pressure fluctuation measuring unit that calculates a pulse wave transit time using information of the reflected light and calculates a relative blood pressure fluctuation (blood pressure change amount) using the pulse wave transit time.

SUMMARY OF INVENTION

In general, there is a need to perform vein authentication and accurately measure a blood pressure value. However, in the device disclosed in Patent Literature 1, the blood pressure measurement function can only calculate the relative blood pressure fluctuation using the pulse wave transit time.

Here, for example, in a device disclosed in Patent Literature 1, it is conceivable to include an air bag for compressing a wrist in the belt portion and measure a blood pressure value by an oscillometric method. However, in the device disclosed in Patent Literature 1, the light projecting opening and the light receiving opening are formed on the contact surface of the housing portion in contact with the skin of the user. For this reason, even if the air bag is simply included in the belt portion, an artery cannot be well compressed, and thus a problem arises that a blood pressure value cannot be accurately measured.

Therefore, an object of the present invention is to provide a sphygmomanometer capable of performing vein authentication and accurately measuring blood pressure.

In order to achieve the object, a sphygmomanometer of the present disclosure is a sphygmomanometer having a function of performing vein authentication on a subject, the sphygmomanometer comprising:

a blood pressure measuring cuff extending in a longitudinal direction in a belt-like shape and configured to be worn around a rod-shaped site to be measured of a subject in a circumferential direction so as to cover a target region of the site to be measured where veins are present;

a light projecting unit that is, in a plane where the cuff spreads, disposed along an edge portion on one side or edge portions on both sides of the cuff in a width direction perpendicular to the longitudinal direction, and irradiates a periphery of the target region of the site to be measured with light;

a light receiving unit that is provided in a sheet shape along a specific portion of an inner surface of the cuff, the specific portion facing the target region, and receives the light scattered or reflected by the target region to obtain an image including a vein pattern of the target region; and an authentication unit that compares the vein pattern included in the image with a reference vein pattern registered in advance and performs vein authentication on the subject.

In the present specification, the "site to be measured" refers to a site including an upper limb such as an upper arm or a wrist of a subject or a lower limb such as an ankle and through which an artery to be measured for blood pressure passes. The "target region" refers to a region where the vein pattern should be obtained in the site to be measured.

The "blood pressure measuring cuff" typically includes a fluid bag for compressing the site to be measured.

With respect to the blood pressure measuring cuff, the "longitudinal direction" means a direction in which the cuff extends in a belt-like shape, and corresponds to a circumferential direction surrounding the site to be measured in a worn state. The "width direction" means a direction perpendicular to the longitudinal direction in a plane in which the cuff spreads, and corresponds to a direction in which the site to be measured extends in a rod shape in the worn state. Furthermore, a "thickness direction" described later means a direction perpendicular to both the longitudinal direction and the width direction (that is, the plane on which the cuff spreads), and corresponds to a direction perpendicular to an outer circumferential surface of the site to be measured in the worn state.

The "inner surface" of the cuff refers to a surface on an inner circumferential side in a state of surrounding the site to be measured in the circumferential direction. An "outer surface" of the cuff described later refers to a surface on an outer circumferential side in a state of surrounding the site to be measured in the circumferential direction.

The "light projecting unit" is typically an array of light emitting diodes (LEDs).

The expression that the light projecting unit is disposed "along an edge portion on one side or both sides of the cuff in the width direction" means, for example, that the light projecting unit may be disposed along the edge portion of the cuff in an attachment member attached along the cuff, or may be disposed along the edge portion of the cuff in a main body integrally attached to a side of an outer surface of the cuff opposite to the site to be measured.

The "vein authentication" is one of biometric authentication using a pattern recognition technique for an image of a vein pattern under the skin of a human body, and means to identify whether or not a subject currently being measured is the same person as a user having a reference vein pattern registered in advance.

BRIEF DESCRIPTION OF DRAWINGS

The present invention will become more fully understood from the detailed description given hereinbelow and the accompanying drawings which are given by way of illustration only, and thus are not (imitative of the present invention, and wherein.

DESCRIPTION OF EMBODIMENT

Hereinafter, embodiments of the present invention will be described in detail with reference to the drawings.
(Schematic Configuration of Sphygmomanometer)

Figure 1:
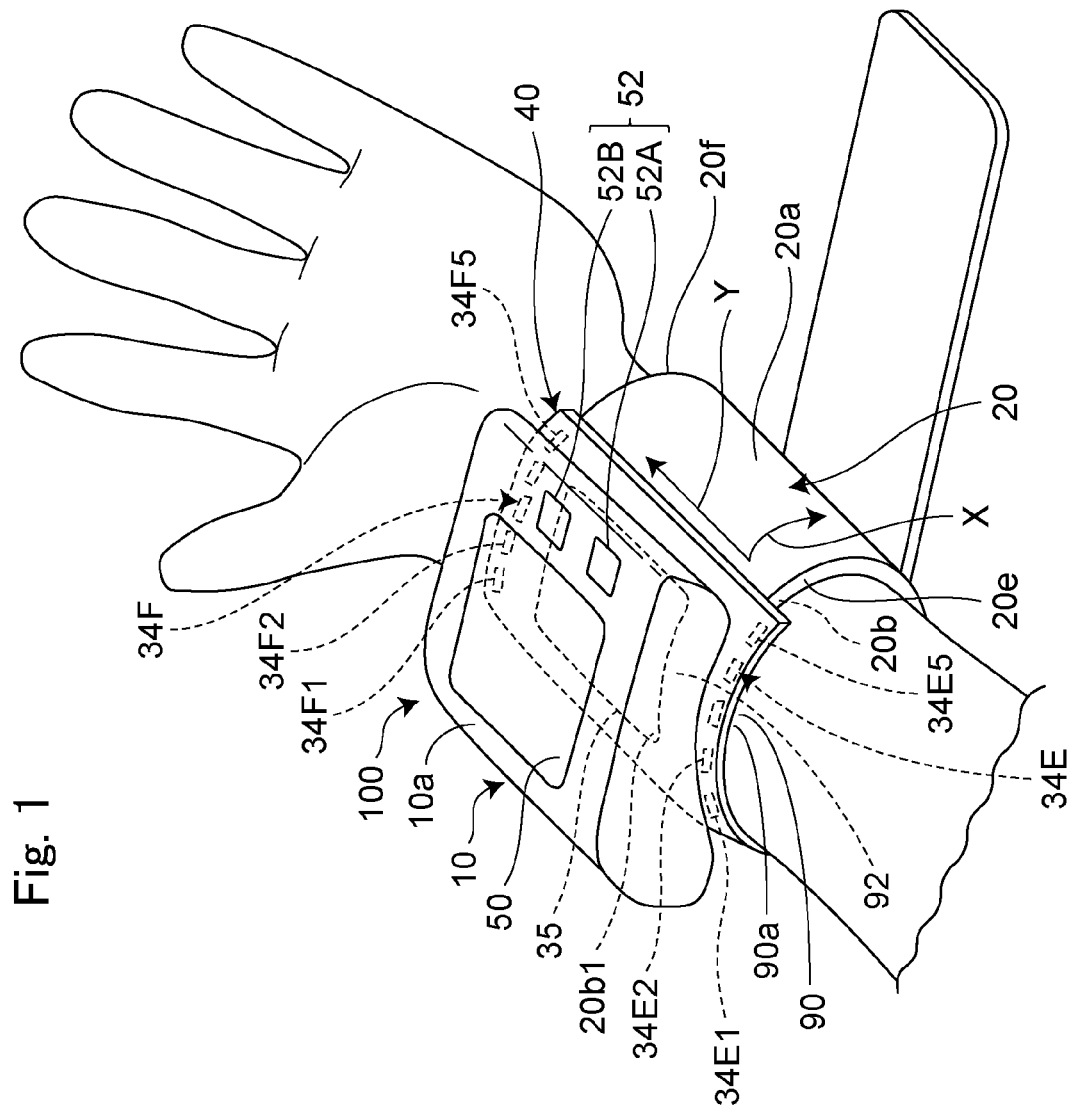
FIG. 1 is a perspective view illustrating an appearance of a sphygmomanometer according to an embodiment of the present invention in a state of being worn around a left wrist as a site to be measured.

FIG. 1 illustrates an appearance of a sphygmomanometer 100 according to an embodiment of the present invention. The sphygmomanometer 100 roughly includes a blood pressure measuring cuff 20 configured to be worn around a rod-shaped site 90 to be measured (in this example, a left wrist) of a subject, a main body 10 integrally attached to a side of an outer surface 20a (in particular, a portion corresponding to a palmar side surface 90a on a palm side) of the cuff 20 and equipped with elements for blood pressure measurement, and an attachment member 40 interposed between the cuff 20 and the main body 10.
(Configuration of Blood Pressure Measuring Cuff)

As can be seen from FIG. 1, the cuff 20 has a belt-like shape (in this example, a rounded rectangle) elongated in a longitudinal direction X in appearance. In this example, the cuff 20 is a general cuff, and is configured by opposing an elongated belt-shaped outer cloth (forming the outer surface 20a) and an inner cloth (forming an inner surface 20b) having a shape corresponding to the outer cloth with a fluid bag 23 (see FIG. 2) interposed therebetween, and sewing or welding peripheral portions (includes edge portions 20e and 20f on both sides in a width direction Y) of the outer cloth and the inner cloth.

Here, the "inner surface 20b" of the cuff 20 refers to a surface on an inner circumferential side in a state of surrounding the site 90 to be measured in a circumferential direction. The "outer surface 20a" of the cuff 20 refers to a surface on an outer circumferential side in a state of surrounding the site 90 to be measured in the circumferential direction. Furthermore, regarding the cuff 20, the "longitudinal direction X" means a direction in which the cuff 20 extends in a belt-like shape, and corresponds to the circumferential direction surrounding the site 90 to be measured in the worn state. The "width direction Y" means a direction perpendicular to the longitudinal direction X in an XY plane in which the cuff 20 spreads, and corresponds to a direction in which the site 90 to be measured extends in a rod shape in the worn state. Furthermore, a "thickness direction Z" illustrated in FIG. 3 to be described later means a direction perpendicular to both the longitudinal direction X and the width direction Y (that is, the XY plane on which the cuff 20 spreads), and corresponds to a direction perpendicular to an outer circumferential surface of the site 90 to be measured in the worn state. Note that FIG. 3 also illustrates an XYZ orthogonal coordinate system (The same applies to FIGS. 6 to 10 described later).
(Configuration of Main Body)

Figure 2:
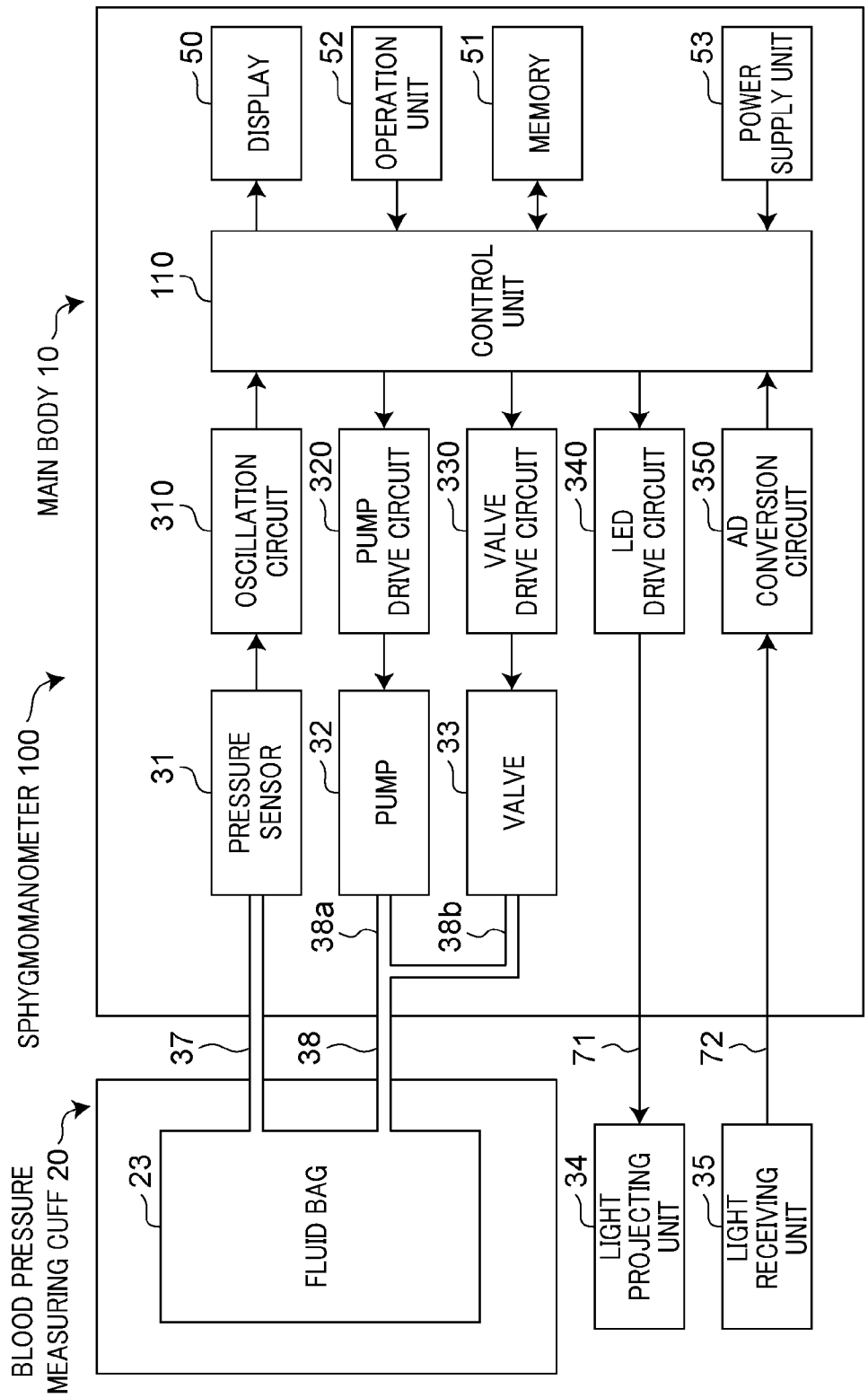
FIG. 2 is a diagram illustrating a block configuration of the sphygmomanometer.

As illustrated in FIG. 2, the main body 10 is equipped with a control unit 110, a display 50, an operation unit 52, a memory 51 as a storage unit, a power supply unit 53, a pressure sensor 31, an oscillation circuit 310, a pump 32, a pump drive circuit 320, a valve 33, a valve drive circuit 330, a light emitting diode (LED) drive circuit 340 and an analog-to-digital (AD) conversion circuit 350. In this example, the pressure sensor 31 is connected to the fluid bag 23 contained in the cuff 20 via one air pipe 37 so as to be capable of fluid communication. Furthermore, an air pipe 38a connected to the pump 32 and an air pipe 38b connected to the valve 33 join to form one air pipe 38, which is connected to the fluid bag 23 so as to be capable of fluid communication. The air pipe 38 is a generic term including these air pipes 38a and 38b.

As illustrated in FIG. 1, the display 50 and the operation unit 52 are disposed on a top surface 10a (a surface far from the cuff 20) of the main body 10. In this example, the display 50 is a liquid crystal display (LCD), and displays predetermined information in accordance with a control signal from the control unit 110. In this example, the display 50 displays a systolic blood pressure SBP (units: mmHg), a diastolic blood pressure DBP (units: mmHg), a pulse rate (unit: beat/min) and results of the vein authentication for the subject. Note that the display 50 may include an organic electro luminescence (EL) display or may include an LED.

In this example, the operation unit 52 includes a measurement switch 52A for receiving an instruction to start/stop the measurement of the blood pressure and a recording call switch 52B, and inputs an operation signal corresponding to the instruction of the user to the control unit 110. Specifically, when the measurement switch 52A is pressed, an operation signal indicating that blood pressure measurement should be started is input to the control unit 110, and the control unit 110 starts blood pressure measurement described later (When the blood pressure measurement is completed, the operation is automatically stopped). When the measurement switch 52A is pressed during the execution of the blood pressure measurement, the control unit 110 urgently stops the blood pressure measurement. Furthermore, when the recording call switch 52B is pressed, the past blood pressure measurement result recorded in the memory 51 is called and displayed on the display 50.

The memory 51 illustrated in FIG. 2 stores data of a program for controlling the sphygmomanometer 100, setting data for setting various functions of the sphygmomanometer 100, data of a measurement result of a blood pressure value, and the like. Furthermore, the memory 51 is used as a work memory or the like when the program is executed.

The control unit 110 includes a central processing unit (CPU) as a processor, and controls the entire operation of the sphygmomanometer 100. Specifically, the control unit 110 acts as a pressure control unit according to a program for controlling the sphygmomanometer 100 stored in the memory 51, and performs control to drive the pump 32 and the valve 33 as pressure devices according to an operation signal from the operation unit 52. Furthermore, the control unit 110 acts as a blood pressure calculation unit, calculates a blood pressure value based on an output of the pressure sensor 31, and controls the display 50 and the memory 51. A specific method of blood pressure measurement will be described later.

The pressure sensor 31 is a piezoresistive pressure sensor in this example, and outputs a pressure (This is referred to as "cuff pressure Pc".) of the fluid bag 23 contained in the cuff 20 as an electric resistance due to the piezoresistive effect through the air pipe 37. The oscillation circuit 310 oscillates at an oscillation frequency corresponding to the electric resistance from the pressure sensor 31. The control unit 110 obtains the cuff pressure Pc according to the oscillation frequency.

The pump 32 is driven by the pump drive circuit 320 based on a control signal given from the control unit 110, and supplies air to the fluid bag 23 contained in the cuff 20 through the air pipe 38. As a result, the pressure (cuff pressure Pc) of the fluid bag 23 is increased.

The valve 33 is a normally-open type electromagnetic valve, is driven by the valve drive circuit 330 based on a control signal given from the control unit 110, and is opened and closed to control the cuff pressure by discharging or enclosing the air in the fluid bag 23 through the air pipe 38.

The LED drive circuit 340 drives a light projecting unit 34 via a wiring 71 on the basis of a control signal given from the control unit 110. Furthermore, the AD conversion circuit 350 performs AD conversion on an electric signal representing an image including a vein pattern from a light receiving unit 35, and inputs the converted signal to the control unit 110. The configurations of the light projecting unit 34 and the light receiving unit 35 will be described later.

The power supply unit 53 supplies power to the control unit 110, the display 50, the memory 51, the pressure sensor 31, the pump 32, the valve 33, and other units in the main body 10.

(Configuration of Attachment Member)

Figure 3:
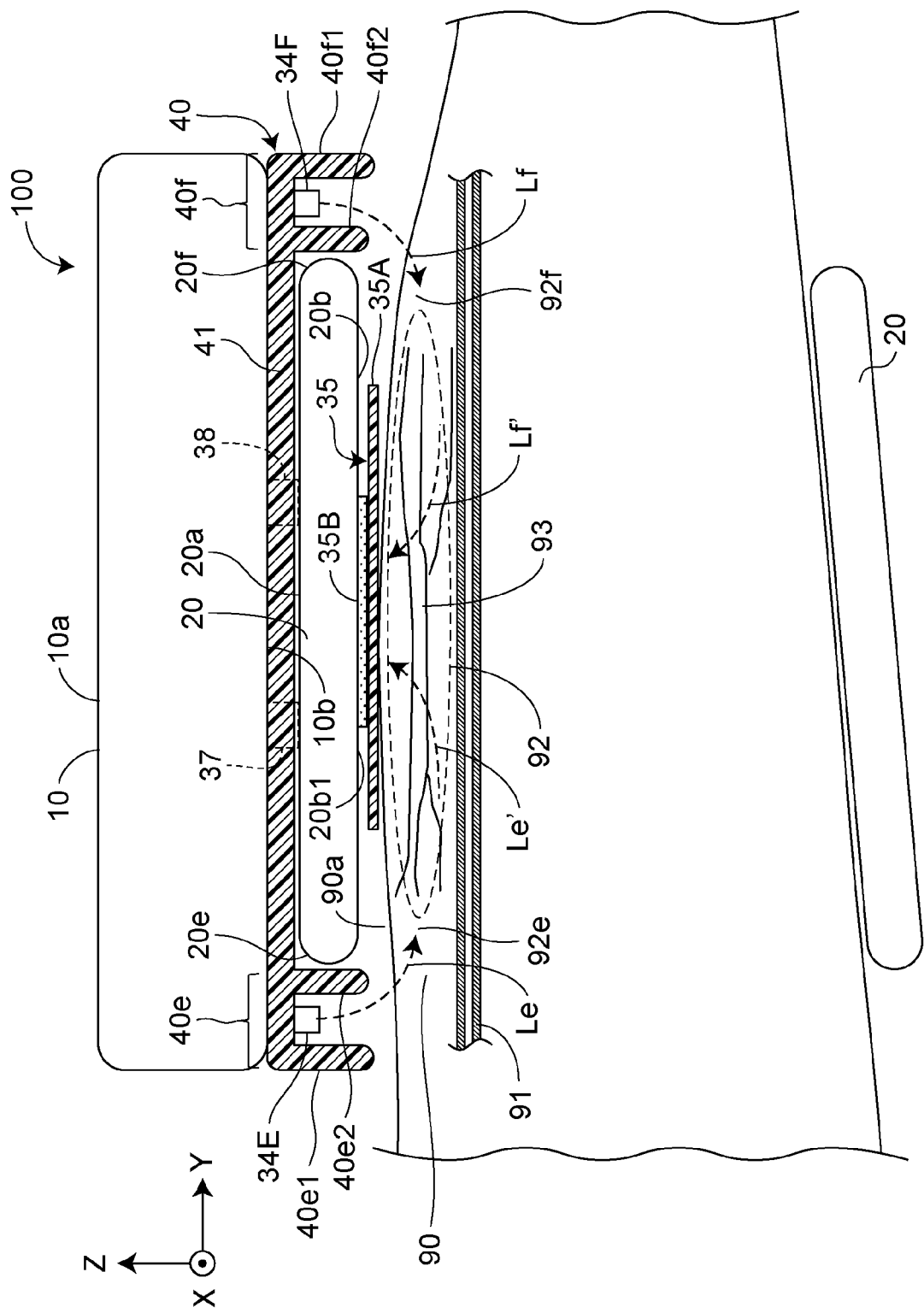
FIG. 3 is a diagram illustrating a cross section along a width direction (a direction in which a site to be measured extends) of a blood pressure measuring cuff in a state where the sphygmomanometer is worn around the site to be measured.

FIG. 3 is a schematic diagram illustrating a cross section along the width direction of the cuff 20 (direction in which the site 90 to be measured extends) in a state where the sphygmomanometer 100 is worn around the site 90 to be measured. Note that, in FIG. 3, a cross section of the inside of the main body 10 and the cuff 20 is not illustrated. As illustrated in FIG. 3, the attachment member 40 includes a plate portion 41 disposed along the outer surface 20a of the cuff 20. In this example, the plate portion 41 is attached to the outer surface 20a of the cuff 20 with an adhesive (not illustrated). End side regions 40e and 40f on both sides in the width direction Y of the attachment member 40 (plate portion 41) protrude outward in the width direction Y from the edge portions 20e and 20f on both sides of the cuff 20, respectively. An outer wall 40e1 protruding toward the site 90 to be measured and an inner wall 40e2 protruding in parallel with the outer wall 40e1 are provided in the end side region 40e on one side. A row 34E of LEDs forming the light projecting unit 34 is mounted in a region between the outer wall 40e1 and the inner wall 40e2 in the end side region 40e. As a result, the row 34E of LEDs is arranged along the edge portion 20e on one side of the cuff 20 in a state of being protected by the outer wall 40e1 and the inner wall 40e2. Similarly, an outer wall 40f1 protruding toward the site 90 to be measured and an inner wall 40f2 protruding in parallel with the outer wall 40f1 are provided in the end side region 40f on the other side. A row 34F of LEDs forming the light projecting unit 34 is mounted in a region between the outer wall 40f1 and the inner wall 40f2 in the end side region 40f. As a result, the row 34F of LEDs is arranged along the edge portion 20f on the other side of the cuff 20 in a state of being protected by the outer wall 40f1 and the inner wall 40f2. A flexible substrate (including the wiring 71) (not illustrated) extending to the main body 10 is connected to each of the rows 34E and 34F of LEDs.

In this example, the plate portion 41, the outer wall 40e1, the inner wall 40e2, the outer wall 40f1, and the inner wall 40f2 are made of an integrally molded synthetic resin (for example, acrylonitrile butadiene styrene (ABS)). Therefore, in the example using the attachment member 40, the light projecting unit 34 (rows 34E and 34F of LEDs) can be disposed along the edge portions 20e and/or 20f of the cuff 20 with a simple configuration.

Distal ends (ends on a side of the site 90 to be measured) of the outer wall 40e1, the inner wall 40e2, the outer wall 40f1, and the inner wall 40f2 are curved in the circumferential direction along the site 90 to be measured (in this example, the palmar side surface 90a), similarly to the plate portion 41 and a bottom surface 10b of the main body 10. Note that in FIG. 3, the distal ends of the outer wall 40e1, the inner wall 40e2, the outer wall 40f1, and the inner wall 40f2 of the attachment member 40 are drawn apart from the site 90 to be measured (in this example, the palmar side surface 90a) for convenience, but are in close contact with the palmar side surface 90a in the actual worn state.

The air pipes 37 and 38 connect the main body 10 and the cuff 20 through a through hole (not illustrated) provided in the plate portion 41.

(Configurations of Light Projecting Unit and Light Receiving Unit)

In this example, as illustrated in FIG. 1, the light projecting unit 34 includes the rows 34E and 34F of LEDs arranged along the edge portions 20e and 20f on both sides of the cuff 20 in the width direction Y. The row 34E of LEDs on one side includes five LEDs 34E1, 34E2, . . . , 34E5. Similarly, the row 34F of LEDs on the other side also includes five LEDs 34F1, 34F2, . . . , 34F5. As can be seen from FIG. 1, the light projecting unit 34 is not disposed in a central region (region between the edge portions 20e and 20f on both sides) of the cuff 20 in the width direction Y. According to this arrangement, the light projecting unit 34 (rows 34E and 34F of LEDs) can irradiate peripheries 92e and 92f of a target region 92 of the site 90 to be measured illustrated in FIG. 3 with lights Le and Lf. In this example, it is assumed that near-infrared light (about 700 nm to about 2500 nm), particularly light having a wavelength of 850 nm is used as the lights Le and Lf to be irradiated.

Furthermore, as illustrated in FIG. 1, the light receiving unit 35 is provided in a sheet shape along a specific portion 20b1 facing the target region 92 in the inner surface 20b of the cuff 20. The target region 92 refers to a region where a vein pattern is to be acquired in the site 90 to be measured. Specifically, as illustrated in FIG. 3, the light receiving unit 35 includes a sheet-shaped image pick-up element 35B disposed along the specific portion 20b1 of the inner surface 20b of the cuff 20, and a sheet-shaped image forming element 35A disposed along a surface of the image pick-up element 35B on a side facing the target region 92. In this example, the image pick-up element 35B is attached to the specific portion 20b1 of the cuff 20 with an adhesive (not illustrated). Furthermore, in this example, the image forming element 35A is attached to the image pick-up element 35B and the specific portion 20b1 of the cuff 20 around the image pick-up element 35B with an adhesive (not illustrated). The image forming element 35A allows the light to transmit in one direction Z (corresponding to the thickness direction Z of the cuff 20) perpendicular to a plane on which the image forming element 35A extends, and blocks the light in a direction other than the one direction Z. As such the image forming element 35A, for example, an all-round privacy filter manufactured by Asdeck Corporation can be used. The image pick-up element 35B receives the light transmitted through the image forming element 35A, and outputs an electric signal representing the received light. As such the image pick-up element 35B, a thin image sensor manufactured by Japan Display Co., Ltd. can be used. In this example, the image pick-up element 35B outputs an electric signal representing an image including a vein pattern of the target region 92. A flexible substrate (including a wiring 72) (not illustrated) extending to the main body 10 is connected to the image pick-up element 35B.

(Worn State of Blood Pressure Measuring Cuff)

As illustrated in FIG. 3, the cuff 20 is worn in a state in which the longitudinal direction X of the cuff 20 surrounds the outer circumferential surface of the site 90 to be measured (in this example, the left wrist) so as to cover the target region 92 where some veins 93 are present. At the time of wearing, the cuff 20 is fixed so as not to be loosened by a hook-and-loop fastener (not illustrated). Here, the site 90 to be measured refers to a site through which an artery 91 to be subjected to blood pressure measurement passes. Furthermore, as described above, the target region 92 refers to a region of the site 90 to be measured where a vein pattern is to be acquired. In this worn state, the image forming element 35A, the image pick-up element 35B, the cuff 20 containing the fluid bag 23, and the main body 10 are arranged in this order in the thickness direction Z with respect to the palmar side surface 90a of the site 90 to be measured.

(Blood Pressure Measurement)

Figure 4:
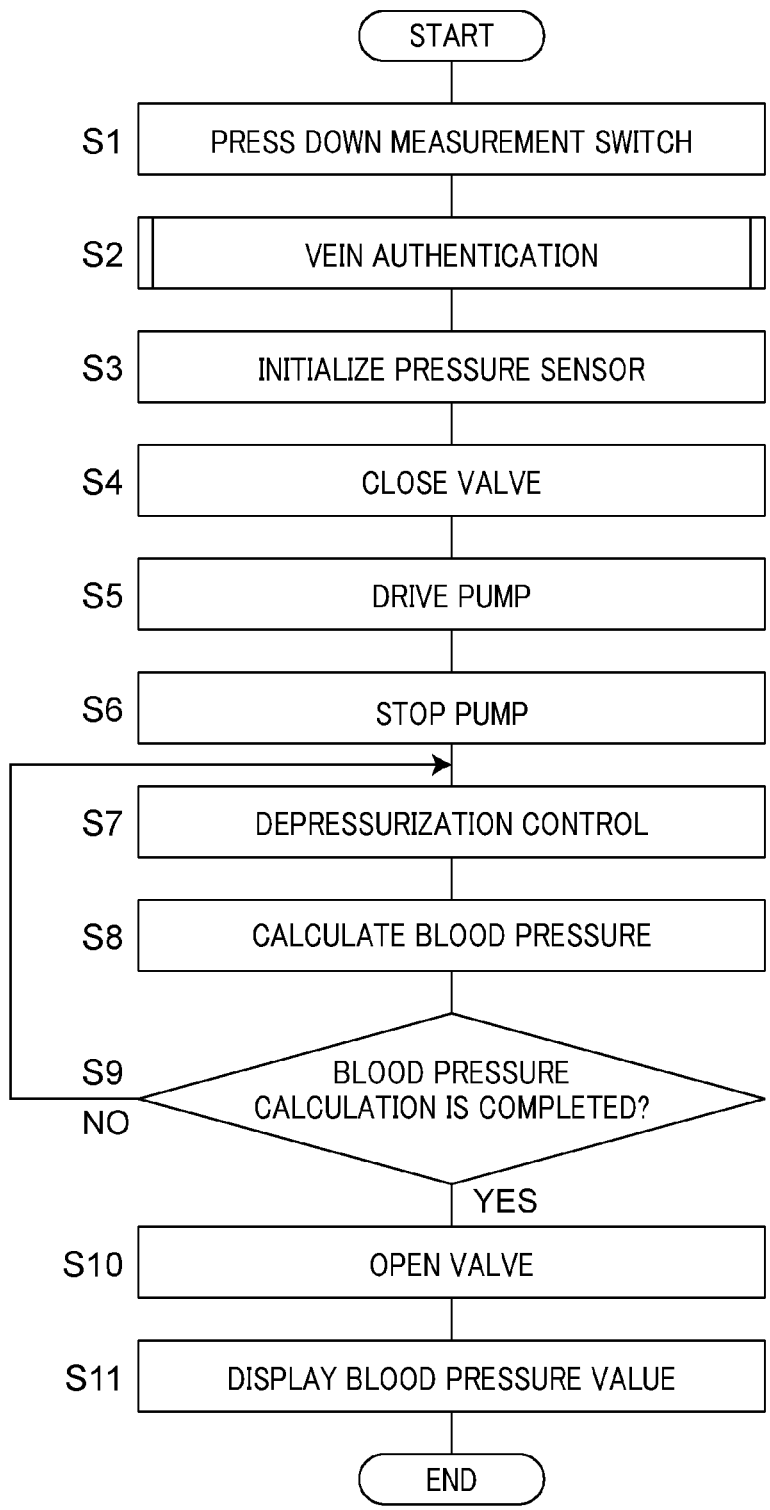
FIG. 4 is a diagram illustrating a flow of blood pressure measurement by the sphygmomanometer.

FIG. 4 illustrates an operation flow when the subject performs blood pressure measurement including vein authentication by the sphygmomanometer 100. Note that it is assumed that a vein pattern obtained in advance for the left wrist of the user is registered (stored) in the memory 51 as a reference vein pattern Pr (schematically illustrated in FIG. 5C).

When the user instructs start of measurement with the measurement switch 52A provided on the main body 10 in the worn state where the cuff 20 is worn around the site 90 to be measured (step S1 in FIG. 4), the control unit 110 first performs vein authentication processing on the current subject (step S2 in FIG. 4).

Figure 5:
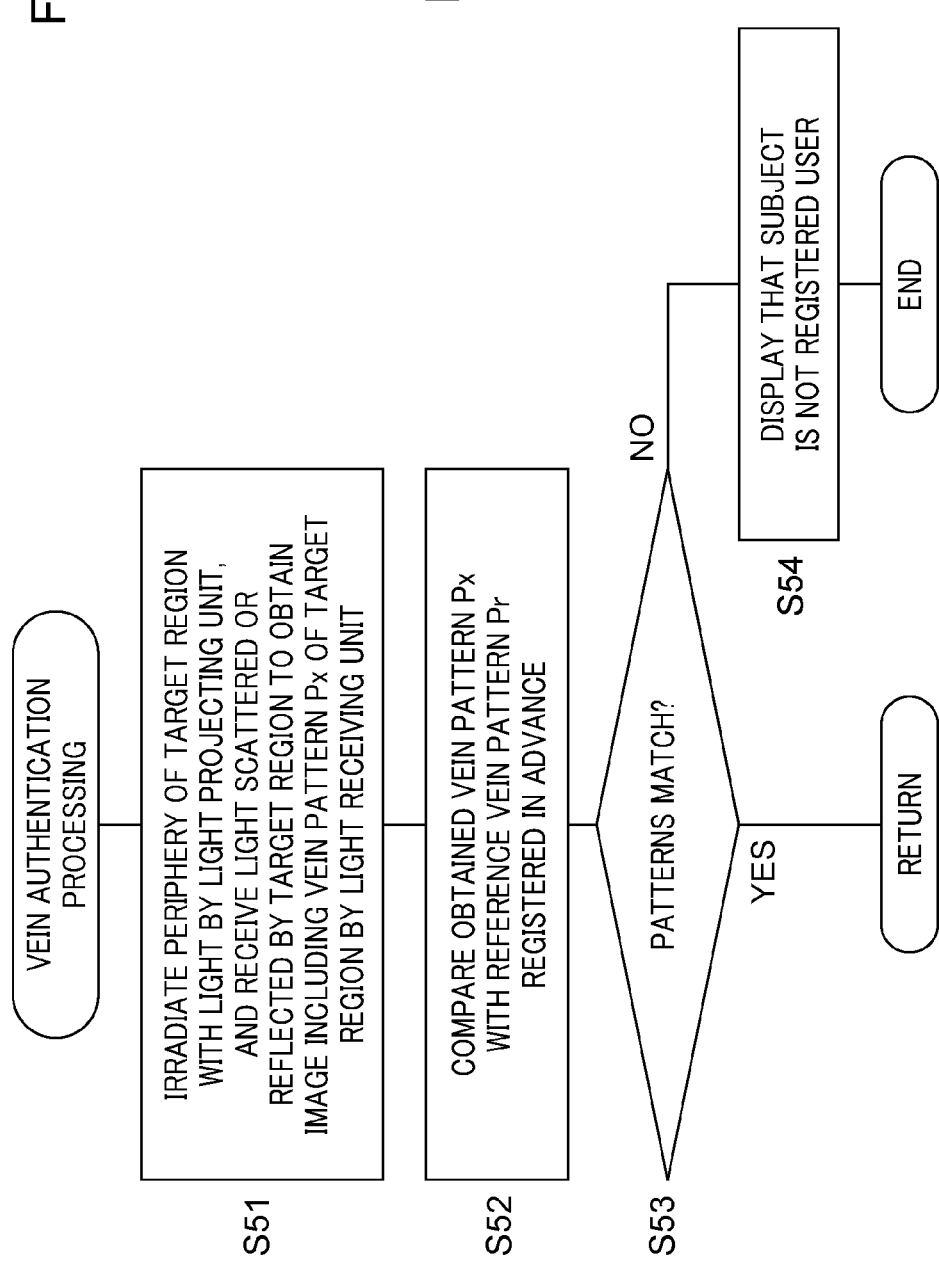
FIG. 5A is a diagram illustrating a flow of vein authentication processing.
FIG. 5B is a diagram schematically illustrating a vein pattern obtained for a subject.
FIG. 5C is a diagram schematically illustrating a reference vein pattern registered in advance.

Specifically, as illustrated in step S51 of FIG. 5A, the control unit 110 drives the light projecting unit 34 (rows 34E and 34F of LEDs) by the LED drive circuit 340 to irradiate the peripheries 92e and 92f of the target region 92 of the site 90 to be measured illustrated in FIG. 3 with lights Le and Lf. Then, the light receiving unit 35 (image forming element 35A, image pick-up element 35B) receives lights Le' and Lf' scattered or reflected by the target region 92, and obtains an image including a vein pattern Px (schematically illustrated in FIG. 5B) of the target region 92 for the subject under measurement. Next, in step S52 of FIG. 5A, the control unit 110 acts as an authentication unit, compares the vein pattern Px included in the image with the reference vein pattern Pr registered in advance, and performs the vein authentication on the subject. Thus, it is identified whether or not the subject currently being measured is the same person as a user having the reference vein pattern Pr registered in advance. Note that the vein authentication itself using the pattern recognition technique is a known technique, and thus a detailed description thereof will be omitted.

Here, in a case where the vein pattern Px of the subject currently being measured does not match the reference vein pattern Pr registered in advance (NO in step S53 in FIG. 5A), the control unit 110 displays on the display 50 that the subject is not a registered user, and ends the processing (step S54 in FIG. 5A). That is, the blood pressure measurement is not performed. On the other hand, in a case where the vein pattern Px of the subject currently being measured matches the reference vein pattern Pr registered in advance (YES in step S53 in FIG. 5A), the control unit 110 returns to the blood pressure measurement flow in FIG. 4 and advances processing of the blood pressure measurement as follows.

That is, the control unit 110 first performs initialization (step S3 in FIG. 4). Specifically, the control unit 110 initializes a processing memory area, stops the pump 32, and performs 0 mmHg adjustment (The atmospheric pressure is set to 0 mmHg.) of the pressure sensor 31 in a state where the valve 33 is opened.

Subsequently, the control unit 110 acts as a pressure control unit, closes the valve 33 (step S4), drives the pump 32, and starts pressurizing the cuff 20 (step S5). That is, the control unit 110 supplies air from the pump 32 to (the fluid bag 23 contained in) the cuff 20 through the air pipe 38. At the same time, the pressure sensor 31 acts as a pressure detection unit to detect a pressure of the fluid bag 23 through the air pipe 37. The control unit 110 controls a pressurization rate by the pump 32 based on an output of the pressure sensor 31. By this pressurization, the artery 91 passing through the site 90 to be measured is compressed and ischemic.

Next, based on the output of the pressure sensor 31, the control unit 110 stops the pump 32 (step S6) when a pressure (cuff pressure Pc) of the cuff 20 (fluid bag 23) reaches a predetermined value (a value well above an assumed blood pressure value of the subject. In this example, it is defined as a blood pressure value of the subject measured last time plus 40 mmHg.).

Subsequently, the control unit 110 gradually opens the valve 33 (step S7 in FIG. 4). As a result, the cuff pressure Pc is reduced at a substantially constant speed. Here, a pulse wave signal (fluctuation component) as pulse wave information by a pulse wave is superimposed on the cuff pressure Pc detected by the pressure sensor 31 through the air pipe 37.

In the depressurization process, the control unit 110 acts as a blood pressure calculation unit to extract the pulse wave signal (fluctuation component) superimposed on the cuff pressure Pc, and attempts to calculate a blood pressure value (systolic blood pressure (SBP) and diastolic blood pressure (DBP)) by, for example, a known oscillometric method based on the pulse wave signal acquired at this time (step S8 in FIG. 4). Furthermore, in this example, the control unit 110 calculates a pulse rate (beats/min) on the basis of the pulse wave signal.

In a case where the blood pressure value and the pulse rate cannot be calculated yet due to lack of data (NO in step S9 in FIG. 4), the control unit 110 repeats the processing of steps S7 to S9 until the blood pressure value and the pulse rate can be calculated.

In a case where the blood pressure value and the pulse rate can be calculated in this manner (YES in step S9), the control unit 110 acts as a pressure control unit, and performs control to open the valve 33 and rapidly exhaust the air in the cuff 20 (fluid bag 23) (step S10).

Thereafter, the control unit 110 displays the calculated blood pressure value and pulse rate on the display 50 (step S11), and performs control to store the blood pressure value and the pulse rate in the memory 51.

Note that, in the above example, the blood pressure value and the pulse rate are calculated in the depressurization process of the cuff 20 (fluid bag 23), but the present invention is not limited thereto, and the blood pressure value and the pulse rate may be calculated in the pressurization process of the cuff 20 (fluid bag 23).

In the sphygmomanometer 100, in the worn state, the light projecting unit 34 (rows 34E and 34F of LEDs) is disposed only along the edge portion 20e or/and 20f on one side or both sides of the cuff 20 in the width direction Y. That is, the light projecting unit 34 is not disposed in the central region (region between the edge portions 20e and 20f on both sides) of the cuff 20 in the width direction Y. Therefore, for example, even in a case where the light projecting unit 34 includes a row of light emitting diodes (LEDs) having a thickness of about 1 mm to 2 mm, the presence of the light projecting unit 34 (rows 34E and 34F of LEDs) does not impair the compression performance of the cuff 20. Furthermore, the light receiving unit 35 (image forming element 35A and image pick-up element 35B) is provided in a sheet shape along the specific portion 20b1 facing the target region 92 in the inner surface 20b of the cuff 20. Therefore, the presence of the light receiving unit 35 does not impair the compression performance of the cuff 20. Therefore, according to the sphygmomanometer 100, a blood pressure can be accurately measured.

As described above, according to the sphygmomanometer 100, the vein authentication can be performed, and the blood pressure can be accurately measured.

Furthermore, in the sphygmomanometer 100, the main body 10 is integrally attached to the cuff 20 on the side opposite to the site 90 to be measured. Therefore, the sphygmomanometer 100 can be configured more compact than, for example, a tabletop sphygmomanometer (a sphygmomanometer of a type in which a main body is provided apart from a blood pressure measuring cuff and is connected to a fluid bag of the cuff so as to be capable of flowing a fluid through a flexible tube). Furthermore, in the sphygmomanometer 100, lengths of the wirings 71 and 72 connecting between the light projecting unit 34 and the light receiving unit 35, and the main body 10 may be relatively short, and the reliability of the wirings 71 and 72 can be enhanced.
(Modification 1)

Figure 6:
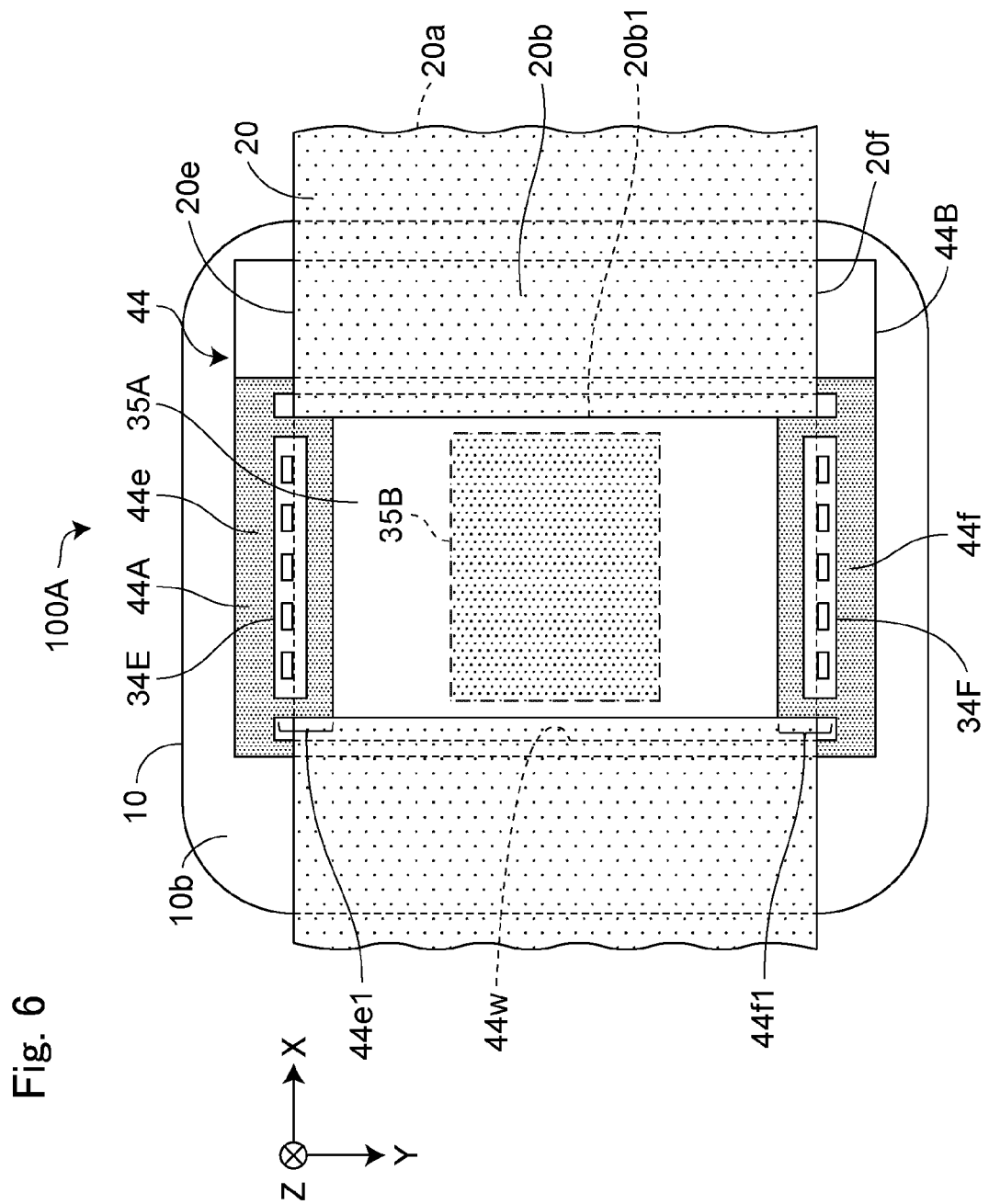
FIG. 6 is a view illustrating a portion including a main body of a sphygmomanometer according to Modification 1 obtained by modifying the sphygmomanometer in FIG. 1 as viewed from a back side (a side in contact with a site to be measured).
Figure 7A:
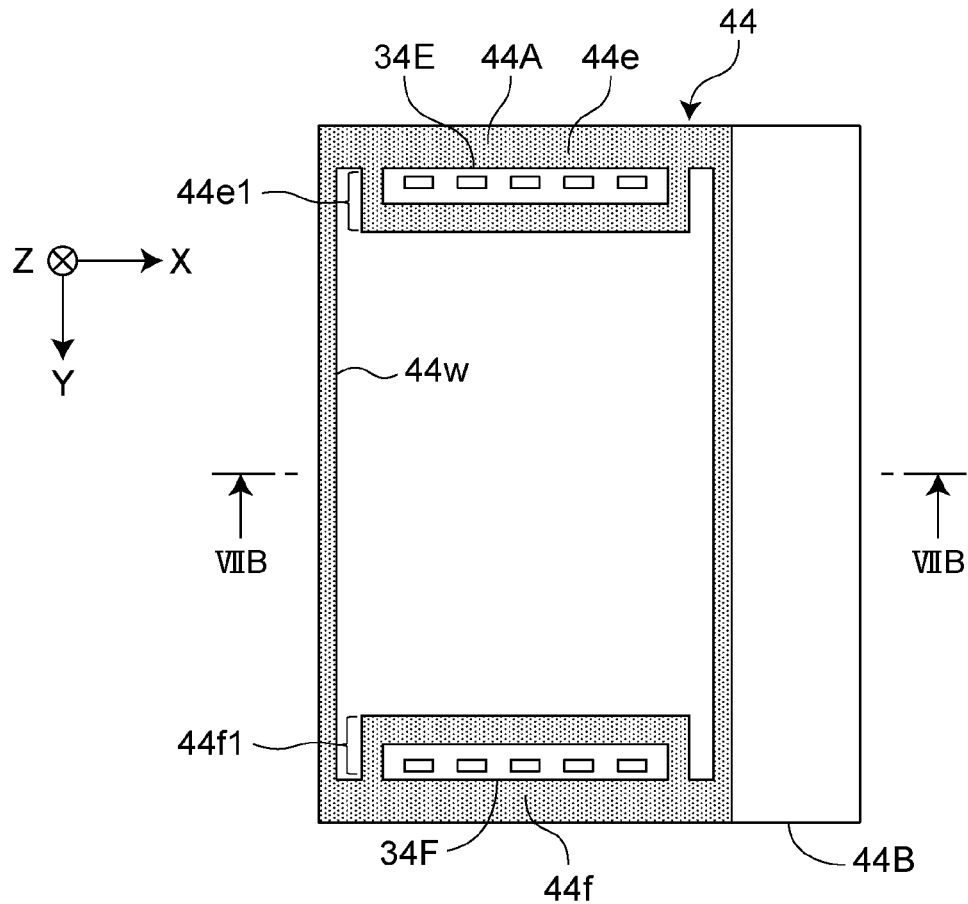
FIG. 7A is a diagram illustrating a planar layout of a flexible substrate included in the sphygmomanometer of Modification 1.
Figure 7B:
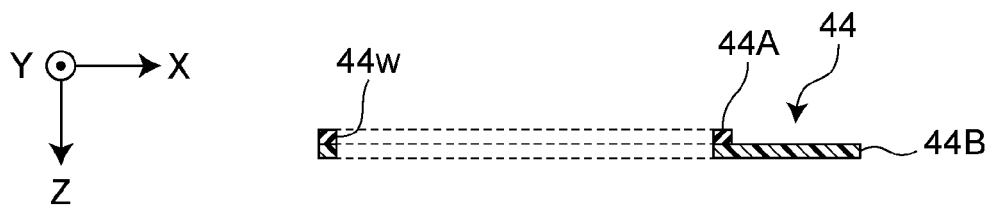
FIG. 7B is a diagram illustrating a cross section (an end face) taken along a line VIIB-VIIB in FIG. 7A.

FIG. 6 illustrates a portion including the main body 10 of a sphygmomanometer (denoted by reference sign 100A) of Modification 1 obtained by modifying the sphygmomanometer 100 as viewed from a back side (a side in contact with the site 90 to be measured). The sphygmomanometer 100A is different in that a rectangular frame-shaped flexible substrate 44 is provided as an attachment member instead of the attachment member 40 described above. The main body 10 and the cuff 20 are the same as those in the sphygmomanometer 100. In FIG. 6 and FIGS. 7A and 7B described below, the same components as those in the sphygmomanometer 100 are denoted by the same reference signs, and redundant description is omitted.

FIG. 7A illustrates a planar layout of the flexible substrate 44 along an XY plane in which the cuff 20 spreads. FIG. 7B schematically illustrates a cross section (an end face) taken along a line VIIB-VIIB in FIG. 7A. The flexible substrate 44 includes a polyimide resin layer 44B provided with the wiring 71 (Illustration is omitted in FIGS. 7A and 7B), and a light shielding elastomer layer 44A laminated on the polyimide resin layer 44B. Note that a thickness of each layer in FIG. 7B is exaggerated for easy understanding. In the flexible substrate 44, a central opening 44w having a substantially rectangular shape is formed in a region where the polyimide resin layer 44B and the elastomer layer 44A overlap each other. As a result, the flexible substrate 44 as a whole has a rectangular frame shape surrounding the central opening 44w.

In this example, as can be seen from FIG. 7A, end side regions 44e and 44f of the flexible substrate 44 have engagement regions 44e1 and 44f1, each of the engagement regions 44e1 and 44f1 protruding from a side facing the central opening 44w toward the central opening 44w, partially with respect to a direction along the longitudinal direction X.

In an assembly process of the sphygmomanometer 100A, as illustrated in FIG. 6, first, the engagement regions 44e1 and 44f1 are bent and disposed along the inner surface 20b of the cuff 20. As a result, an engagement state in which the flexible substrate 44 are engaged with the cuff 20 is obtained, and the flexible substrate 44 is easily positioned with respect to the cuff 20. In this engagement state, the image pick-up element 35B and the image forming element 35A constituting the light receiving unit 35 are attached in this order to the specific portion 20b1 of the inner surface 20b of the cuff 20. Furthermore, the main body 10 is integrally attached to the outer surface 20a of the cuff 20. As a result, the assembly is facilitated. Note that before the flexible substrate 44 and the cuff 20 are brought into the engagement state, the image pick-up element 35B and the image forming element 35A constituting the light receiving unit 35 may be attached in advance to the specific portion 20b1 of the inner surface 20b of the cuff 20.

As can be seen from FIG. 6, the end side regions 44e and 44f on both sides in the width direction Y of the flexible substrate 44 protrude outward in the width direction Y from the edge portions 20e and 20f on both sides of the cuff 20, respectively, similarly to those of the attachment member 40. In each of the end side regions 44e and 44f, the rows 34E and 34F of LEDs constituting the light projecting unit 34 are mounted. That is, similarly to the sphygmomanometer 100, the rows 34E and 34F of LEDs are arranged only along the edge portion 20e or/and 20f on one side or both sides of the cuff 20 in the width direction Y. As a result, also in the sphygmomanometer 100A, the light projecting unit 34 (rows 34E and 34F of LEDs) can be disposed along the edge portions 20e and/or 20f of the cuff 20 with a simple configuration.

In the sphygmomanometer 100A, similarly to the sphygmomanometer 100, the cuff 20 is worn around the site 90 to be measured of the subject in the circumferential direction so as to cover the target region 92. In this worn state, the end side regions 44e and 44f are pressed against the palmar side surface 90a, and the deflection of the engagement regions 44e1 and 44f1 is substantially eliminated. Therefore, similarly to the sphygmomanometer 100, the light projecting unit 34 (rows 34E and 34F of LEDs) can irradiate the peripheries 92e and 92f of the target region 92 of the site 90 to be measured with the lights Le and LE Furthermore, the light receiving unit 35 (image forming element 35A and image pick-up element 35B) can obtain an image including the vein pattern Px of the target region 92. Furthermore, the presence of the light projecting unit 34 and the light receiving unit 35 does not impair the compression performance of the cuff 20. Therefore, according to the sphygmomanometer 100A, similarly to the sphygmomanometer 100, the vein authentication can be performed, and the blood pressure can be accurately measured.

(Modification 2)

Figure 8:
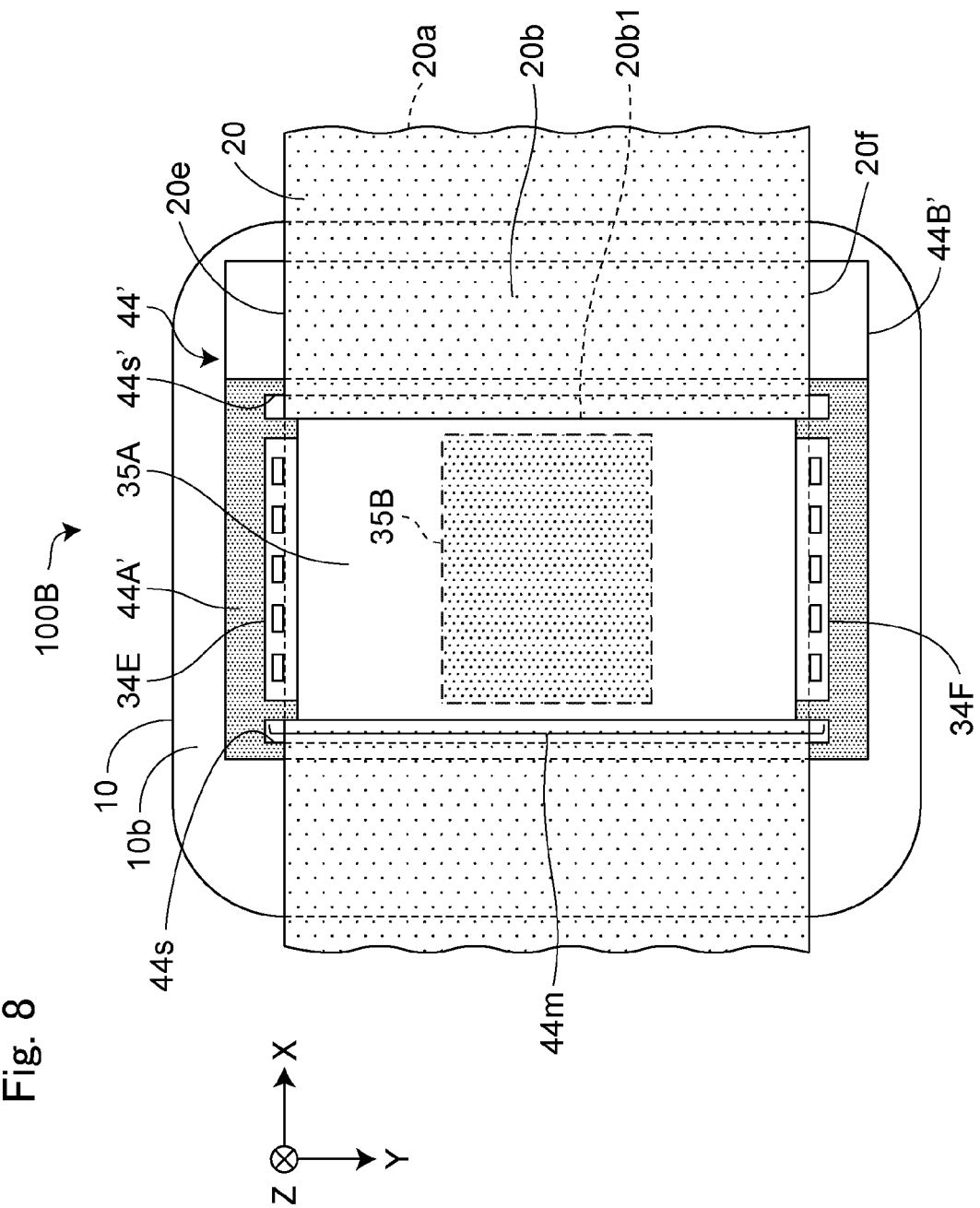
FIG. 8 is a diagram illustrating a portion including a main body of a sphygmomanometer according to Modification 2 obtained by modifying the sphygmomanometer in FIG. 1 as viewed from a back side (a side in contact with a site to be measured).
Figure 9A:
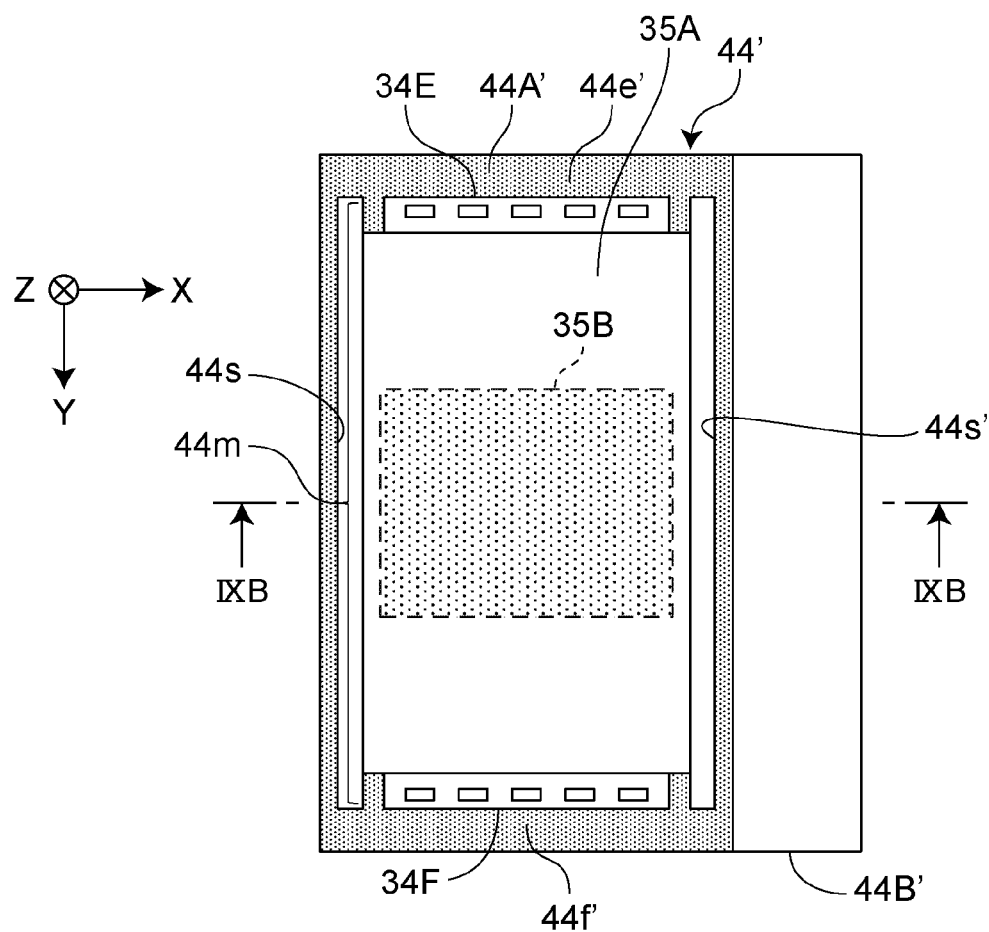
FIG. 9A is a diagram illustrating a planar layout of a flexible substrate included in the sphygmomanometer of Modification 2.
Figure 9B:
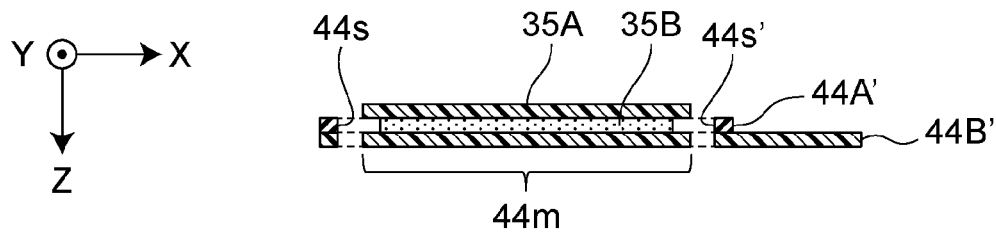
FIG. 9B is a diagram illustrating a cross section (an end face) taken along a line IXB-IXB in FIG. 9A.

FIG. 8 illustrates a portion including the main body 10 of a sphygmomanometer (denoted by reference sign 100B) of Modification 2 obtained by modifying the sphygmomanometer 100 as viewed from a back side (a side in contact with the site 90 to be measured). The sphygmomanometer 100B is different in that a rectangular plate-shaped flexible substrate 44' is provided as an attachment member instead of the attachment member 40 described above. The main body 10 and the cuff 20 are the same as those in the sphygmomanometer 100. In FIG. 8 and FIGS. 9A and 9B described below, the same components as those in the sphygmomanometer 100 are denoted by the same reference signs, and redundant description is omitted.

FIG. 9A illustrates a planar layout of the flexible substrate 44' along an XY plane in which the cuff 20 spreads. FIG. 9B illustrates a cross section (an end face) taken along line IXB-IXB in FIG. 9A. The flexible substrate 44' includes a polyimide resin layer 44B' provided with the wiring 71 (Illustration is omitted in FIGS. 9A and 9B) and a light shielding elastomer layer 44A' laminated on the polyimide resin layer 44B'. The polyimide resin layer 44B' is formed in a shape that occupies substantially the entire region (Slits 44s and 44s' to be described later are excluded.) of the rectangle. On the other hand, the elastomer layer 44A' is formed in a rectangular frame shape. In the flexible substrate 44', the image pick-up element 35B and the image forming element 35A constituting the light receiving unit 35 are laminated in this order and attached to a mounting region 44m (in particular, a region between end side regions 44e' and 44f) occupying a center of the polyimide resin layer 44B'. Note that a thickness of each layer in FIG. 9B is exaggerated for easy understanding.

In this example, as can be seen from FIG. 9A, in the flexible substrate 44', a pair of slits 44s and 44s' for passing the cuff 20 therethrough are formed in portions corresponding, in a direction along the longitudinal direction X of the cuff 20, to both sides of the mounting region 44m on which the light projecting unit 34 (rows 34E and 34F of LEDs) and the light receiving unit 35 (image forming element 35A and image pick-up element 35B) are mounted. In a direction along the width direction Y of the cuff 20, dimensions of the slits 44s and 44s' are set to be slightly larger than a dimension in the width direction Y of the cuff 20.

In an assembly process of the sphygmomanometer 100B, as illustrated in FIG. 8, first, there is made a state in which the specific portion 20b1 of the cuff 20 overlaps a back surface side (a side opposite to the side facing the site 90 to be measured) of the mounting region 44m of the flexible substrate 44', and the cuff extends from the back surface side to a side facing the site 90 to be measured through the pair of slits 44s and 44s'. As a result, an engagement state in which the flexible substrate 44' is engaged with the cuff 20 is obtained, and the flexible substrate 44' is easily positioned with respect to the cuff 20. Furthermore, when the flexible substrate 44' is attached to the cuff 20, the light projecting unit 34 (rows 34E and 34F of LEDs) and the light receiving unit 35 (image forming element 35A and image pick-up element 35B) are simultaneously attached. As a result, the assembly is facilitated. In this engagement state, the main body 10 is integrally attached to the outer surface 20a of the cuff 20.

As can be seen from FIG. 8, the end side regions 44e' and 44f on both sides in the width direction Y of the flexible substrate 44' protrude outward in the width direction Y from the edge portions 20e and 20f on both sides of the cuff 20, respectively, similarly to those of the attachment member 40. In the end side regions 44e' and 44f, the rows 34E and 34F of LEDs constituting the light projecting unit 34 are mounted, respectively. That is, similarly to the sphygmomanometer 100, the rows 34E and 34F of LEDs are arranged only along the edge portion 20e or/and 20f on one side or both sides of the cuff 20 in the width direction Y. As a result, also in the sphygmomanometer 100B, the light projecting unit 34 (rows 34E and 34F of LEDs) can be disposed along the edge portions 20e and/or 20f of the cuff 20 with a simple configuration. Furthermore, the light receiving unit 35 (image forming element 35A and image pick-up element 35B) can be disposed along the specific portion 20b1 facing the target region 92.

In the sphygmomanometer 100B, similarly to the sphygmomanometer 100, the cuff 20 is worn around the site 90 to be measured of the subject in the circumferential direction so as to cover the target region 92. In this worn state, the light projecting unit 34 (rows 34E and 34F of LEDs) can irradiate the peripheries 92e and 92f of the target region 92 of the site 90 to be measured with the lights Le and Lf, similarly to the sphygmomanometer 100. Furthermore, the light receiving unit 35 (image forming element 35A and image pick-up element 35B) can obtain an image including the vein pattern Px of the target region 92. Furthermore, the presence of the light projecting unit 34 and the light receiving unit 35 does not impair the compression performance of the cuff 20. Therefore, according to the sphygmomanometer 100B, similarly to the sphygmomanometer 100, the vein authentication can be performed, and the blood pressure can be accurately measured.

(Modification 3)

Figure 10:
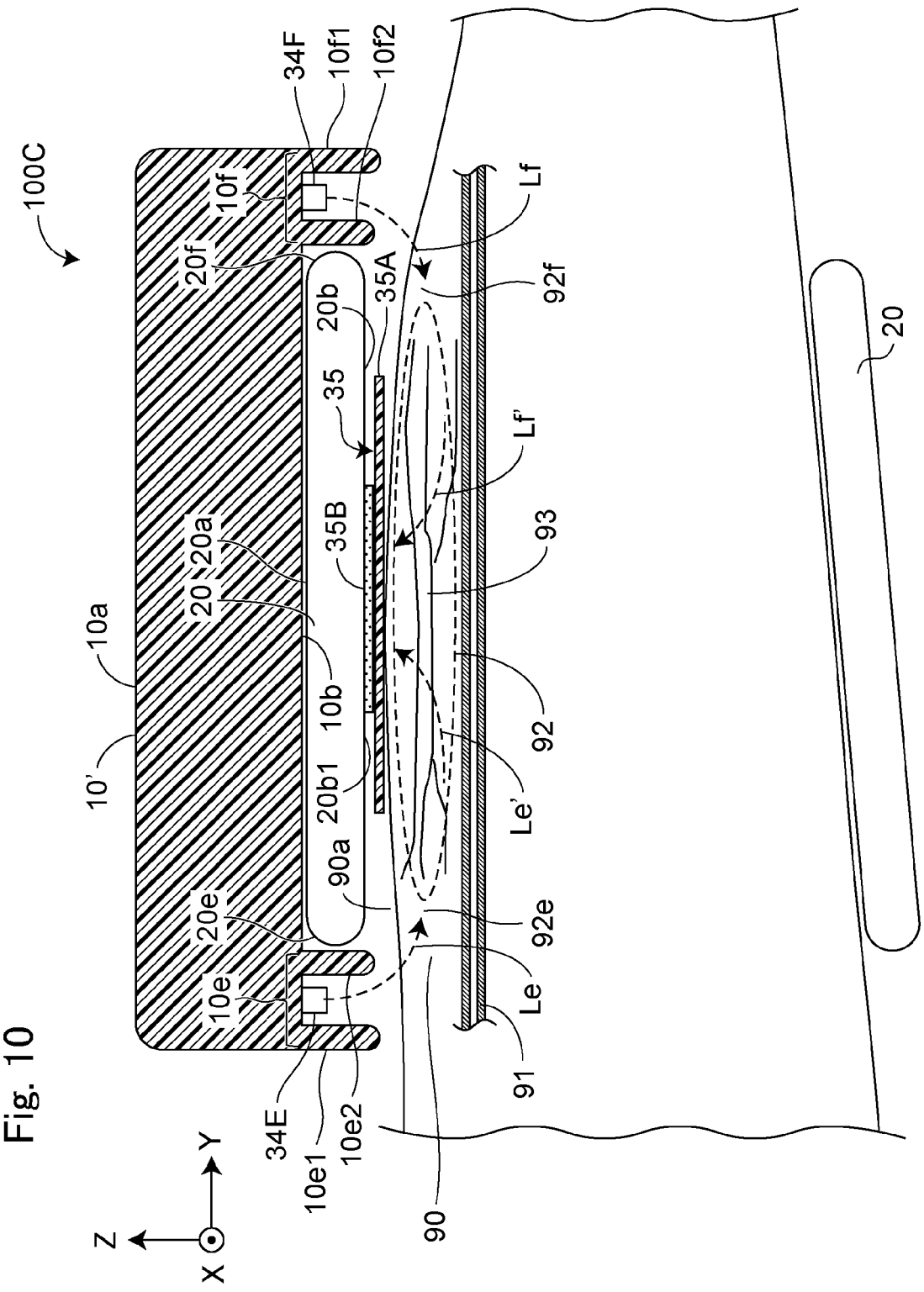
FIG. 10 is a diagram corresponding to FIG. 3 and illustrating a sphygmomanometer of Modification 3 obtained by modifying the sphygmomanometer of FIG. 1.

In each of the above-described Modifications, the attachment member (attachment member 40, flexible substrate 44 or 44') configured separately from the main body 10 is provided, but the present invention is not limited thereto. FIG. 10 corresponds to FIG. 3 and illustrates a sphygmomanometer 100C of Modification 3 obtained by modifying the sphygmomanometer 100. In the sphygmomanometer 100C, on the bottom surface 10b of the main body (denoted by reference sign 10'), the rows 34E and 34F of the LEDs constituting the light projecting unit 34 are arranged in end side regions 10e and 10f protruding outward in the width direction Y from the edge portions 20e and 20f on both sides of the cuff 20, respectively.

Specifically, an outer wall 10e1 protruding toward the site 90 to be measured and an inner wall 10e2 protruding in parallel with the outer wall 10e1 are provided in the end side region 10e on one side. The row 34E of LEDs forming the light projecting unit 34 is mounted in a region between the outer wall 10e1 and the inner wall 10e2 in the end side region 10e. As a result, the row 34E of LEDs is arranged along the edge portion 20e on one side of the cuff 20 in a state of being protected by the outer wall 10e1 and the inner wall 10e2. Similarly, an outer wall 10f1 protruding toward the site 90 to be measured and an inner wall 10f2 protruding in parallel with the outer wall 10f1 are provided in the end side region 10f on the other side. The row 34F of LEDs forming the light projecting unit 34 is mounted in a region between the outer wall 10f1 and the inner wall 1012 in the end side region 10f. As a result, the row 34F of LEDs is arranged along the edge portion 20f on the other side of the cuff 20 in a state of being protected by the outer wall 10f1 and the inner wall 1012. A flexible substrate (including the wiring 71) (not illustrated) extending to the main body 10 is connected to each of the rows 34E and 34F of LEDs.

Distal ends (ends on the site 90 to be measured side) of the outer wall 10e1, the inner wall 10e2, the outer wall 1011, and the inner wall 1012 are curved in the circumferential direction along the site 90 to be measured (in this example, the palmar side surface 90a), similarly to the bottom surface 10f2 of the main body 10.

The other points in the sphygmomanometer 100C are configured similarly to those in the sphygmomanometer 100.

In the sphygmomanometer 100C, similarly to the sphygmomanometer 100, the vein authentication can be performed, and the blood pressure can be accurately measured. Moreover, in the sphygmomanometer 100C, since the attachment member can be omitted, the configuration can be simplified.

(Verification Experiment)

The present inventors conducted a verification experiment to compare blood pressure measurement accuracy for a commercially available wrist-type sphygmomanometer (manufactured by OMRON Healthcare, product number: HEM-6220), the sphygmomanometer 100A of the present invention (in particular, Modification 1 described above), and a sphygmomanometer of a comparative example (represented by reference sign 100X).

As for the sphygmomanometer 100A of the present invention, a main body and a cuff of the wrist-type sphygmomanometer (product number HEM-6220) were used as the main body 10 and the cuff 20. Moreover, the flexible substrate 44 was prepared, and the sphygmomanometer 100A was configured as illustrated in FIG. 6.

As for the sphygmomanometer 100X of the comparative example, a main body and a cuff of the wrist-type sphygmomanometer (product number HEM-6220) were used as the main body 10 and the cuff 20 (Note that, for convenience, the same components as those in the sphygmomanometer 100A will be described using the same reference signs). Moreover, as a flexible substrate (represented by reference sign 44X) for the sphygmomanometer 100X, there was prepared one having an arrangement of the row of LEDs forming the light projecting unit 34 along the entire circumference (four sides) of the image forming element 35A on the flexible substrate 44 in FIG. 6 was prepared. The flexible substrate 44X is disposed along the specific portion 20b1 facing the target region 92 in the inner surface 20b of the cuff 20 to constitute the sphygmomanometer 100X of the comparative example. As a result, in the sphygmomanometer 100X of the comparative example, the row of LEDs constituting the light projecting unit 34 is arranged not only in the end side regions 44e and 44f but also in the central region (region between the edge portions 20e and 20f on both sides) of the cuff 20 in the width direction Y. Moreover, as a flexible substrate (represented by reference sign 44X) for the sphygmomanometer 100X, there was prepared such one having an arrangement of the row of LEDs forming the light projecting unit 34 along the entire circumference (four sides) of the image forming element 35A, with compared to the flexible substrate 44 in FIG. 6. The flexible substrate 44X is disposed along the specific portion 20b1 facing the target region 92 in the inner surface 20b of the cuff 20 to constitute the sphygmomanometer 100X of the comparative example.

Using the commercially available wrist-type sphygmomanometer (manufactured by OMRON Healthcare, product number: HEM-6220), the sphygmomanometer 100A of the present invention, and the sphygmomanometer 100X of the comparative example, blood pressure measurement was repeatedly performed three times for a certain subject. Table 1 below shows an average value of three measured values for a systolic blood pressure SBP and a diastolic blood pressure DBP.

TABLE 1

|  | Commercially available wrist-type sphygmomanometer HEM-6220 | Sphygmomanometer 100A of the present invention | Sphygmomanometer 100X of the comparative example |
| --- | --- | --- | --- |
| Systolic blood pressure SBP | 113 mmHg | 111 mmHg | 124 mmHg |
| Diastolic blood pressure DBP | 74 mmHg | 71 mmHg | 81 mmHg |

As can be seen from Table 1, the measured value of the sphygmomanometer 100X of the comparative example is higher by about 10 mmHg than the measured value of the commercially available wrist-type sphygmomanometer. The reason for this is considered to be that in the sphygmomanometer 100X of the comparative example, the row of LEDs forming the light projecting unit 34 is arranged not only in the end side regions 44e and 44f but also in the central region (region between the edge portions 20e and 20f on both sides) of the cuff 20 in the width direction Y, and thus the compression performance of the cuff 20 is impaired.

On the other hand, in the sphygmomanometer 100A of the present invention, substantially the same measured value is obtained as compared with the measured value of the commercially available wrist-type sphygmomanometer. The reason for this is considered to be that the edge portions 20e and 20f on both sides of the cuff 20 in the width direction Y contribute essentially less to the compression performance than the central region. Therefore, it is considered that there is little influence on the measured value even if the rows 34E and 34F of LEDs constituting the light projecting unit 34 are arranged along the edge portions 20e and 20f on both sides of the cuff 20.

As described above, according to the verification experiment, it has been verified that the blood pressure can be accurately measured according to the sphygmomanometer 100A of the present invention.

Note that in the embodiment described above, the light projecting unit 34 (rows 34E and 34F of LEDs) is disposed along the edge portions 20e and 20f on both sides of the cuff 20, but the present invention is not limited thereto. As long as an image including the vein pattern Px of the target region 92 can be obtained clearly, it may be only disposed along the edge portion 20e or 20f on one side.

Furthermore, in the above embodiment, the site 90 to be measured is the left wrist, but the present invention is not limited thereto. The site 90 to be measured may be a right wrist, an upper limb such as an upper arm, or a lower limb such as an ankle.

Furthermore, in the above-described embodiment, the main bodies 10 and 10' are integrally attached to the cuff 20 (on the side opposite to the site 90 to be measured), but the present invention is not limited thereto. The sphygmomanometer of the present invention can also be configured as a tabletop sphygmomanometer, that is, a type in which a main body is provided apart from a cuff and is connected to a fluid bag of the cuff so as to be capable of flowing a fluid through a flexible tube.

As described above, a sphygmomanometer of the present disclosure is a sphygmomanometer having a function of performing vein authentication on a subject, the sphygmomanometer comprising:

- a blood pressure measuring cuff extending in a longitudinal direction in a belt-like shape and configured to be worn around a rod-shaped site to be measured of a subject in a circumferential direction so as to cover a target region of the site to be measured where veins are present;
- a light projecting unit that is, in a plane where the cuff spreads, disposed along an edge portion on one side or edge portions on both sides of the cuff in a width direction perpendicular to the longitudinal direction, and irradiates a periphery of the target region of the site to be measured with light;
- a light receiving unit that is provided in a sheet shape along a specific portion of an inner surface of the cuff, the specific portion facing the target region, and receives the light scattered or reflected by the target region to obtain an image including a vein pattern of the target region; and
- an authentication unit that compares the vein pattern included in the image with a reference vein pattern registered in advance and performs vein authentication on the subject.

In the present specification, the "site to be measured" refers to a site including an upper limb such as an upper arm or a wrist of a subject or a lower limb such as an ankle and through which an artery to be measured for blood pressure passes. The "target region" refers to a region where the vein pattern should be obtained in the site to be measured.

The "blood pressure measuring cuff" typically includes a fluid bag for compressing the site to be measured.

With respect to the blood pressure measuring cuff, the "longitudinal direction" means a direction in which the cuff extends in a belt-like shape, and corresponds to a circumferential direction surrounding the site to be measured in a worn state. The "width direction" means a direction perpendicular to the longitudinal direction in a plane in which the cuff spreads, and corresponds to a direction in which the site to be measured extends in a rod shape in the worn state. Furthermore, a "thickness direction" means a direction perpendicular to both the longitudinal direction and the width direction (that is, the plane on which the cuff spreads), and corresponds to a direction perpendicular to an outer circumferential surface of the site to be measured in the worn state.

The "inner surface" of the cuff refers to a surface on an inner circumferential side in a state of surrounding the site to be measured in the circumferential direction. An "outer surface" of the cuff refers to a surface on an outer circumferential side in a state of surrounding the site to be measured in the circumferential direction.

The "light projecting unit" is typically an array of light emitting diodes (LEDs).

The expression that the light projecting unit is disposed "along an edge portion on one side or both sides of the cuff in the width direction" means, for example, that the light projecting unit may be disposed along the edge portion of the cuff in an attachment member attached along the cuff, or may be disposed along the edge portion of the cuff in a main body integrally attached to a side of an outer surface of the cuff opposite to the site to be measured.

The "vein authentication" is one of biometric authentication using a pattern recognition technique for an image of a vein pattern under the skin of a human body, and means to identify whether or not a subject currently being measured is the same person as a user having a reference vein pattern registered in advance.

In the sphygmomanometer of the present disclosure, the blood pressure measuring cuff is worn around the rod-shaped site to be measured of the subject in a belt-like shape in the circumferential direction so as to cover the target region where veins are present in the site to be measured (This state is referred to as a "worn state"). The light projecting unit is, in a plane where the cuff spreads, disposed along an edge portion on one side or edge portions on both sides of the cuff in the width direction perpendicular to the longitudinal direction. According to this arrangement, the light projecting unit irradiates the periphery of the target region of the site to be measured (that is, a periphery of one side or both sides of the target region in the width direction) with light. The light receiving unit is provided in a sheet shape along the specific portion of the inner surface of the cuff facing the target region, and receives the light scattered or reflected by the target region to obtain an image including a vein pattern of the target region. The authentication unit compares the vein pattern included in the image with the reference vein pattern registered in advance, and performs vein authentication on the subject. This makes it possible to identify whether or not the subject currently being measured is the same person as the user having the reference vein pattern registered in advance. Thus, according to this sphygmomanometer, the vein authentication can be performed.

Furthermore, in this sphygmomanometer, in the worn state, air is supplied to the blood pressure measuring cuff to pressurize the cuff, so that the site to be measured is compressed to become ischemic (a pressurization process). In this pressurization process or in a depressurization process in which air is discharged from the blood pressure measuring cuff so that the cuff is depressurized, the blood pressure is measured by, for example, an oscillometric method. At this time, the light projecting unit is disposed along the edge portion on one side or the edge portions on both sides of the cuff instead of a central region (region between the edge portions on both sides) of the cuff in the width direction. Therefore, for example, even in a case where the light projecting unit includes a row of light emitting diodes (LEDs) having a thickness of about 1 mm to 2 mm, the presence of the light projecting unit does not impair the compression performance of the cuff. Furthermore, the light receiving unit is provided in a sheet shape along the specific portion of the inner surface of the cuff facing the target region. Therefore, the presence of the light receiving unit does not impair the compression performance of the cuff. Therefore, according to this sphygmomanometer, the blood pressure can be accurately measured.

In the sphygmomanometer according to one embodiment, the light receiving unit includes:

- a sheet-shaped image pick-up element disposed along the specific portion of the inner surface of the cuff; and a sheet-shaped image forming element disposed along a surface of the image pick-up element on a side facing the target region, the image forming element allows the light to transmit in one direction perpendicular to a plane on which the image forming element extends, and blocks the light in a direction other than the one direction, and the image pick-up element receives light transmitted through the image forming element, and outputs an electric signal representing an image including the vein pattern of the target region.

In the sphygmomanometer according to this one embodiment, the sheet-shaped image forming element included in the light receiving unit receives the light scattered or reflected by the target region, allows the light to transmit in one direction (corresponding to a thickness direction of the cuff, that is, a direction perpendicular to an outer circumferential surface of the site to be measured) perpendicular to the plane on which the image forming element extends, and blocks the light in a direction other than the one direction. The light transmitted through the image forming element represents the vein pattern of the target region, and is incident on the sheet-shaped image pick-up element. The image pick-up element receives the light transmitted through the image forming element, and outputs an electric signal representing an image including the vein pattern of the target region. As a result, the image including the vein pattern of the target region is obtained.

The sphygmomanometer according to one embodiment further comprises an attachment member disposed along an outer surface of the cuff, wherein end side regions on both sides in the width direction of the attachment member protrude outward in the width direction from the edge portions on the both sides of the cuff, respectively, and the light projecting unit is disposed along the edge portions of the cuff by being mounted on the end side regions of the attachment member.

Here, each of the "end side regions" of the attachment member means a region in a certain range continuous with a true end side in the width direction.

In the sphygmomanometer according to this one embodiment, the light projecting unit can be disposed along the edge portions of the cuff with a simple configuration.

In the sphygmomanometer according to one embodiment, the attachment member is a rectangular frame-shaped flexible substrate surrounding a central opening, the end side regions of the flexible substrate have engagement regions, each of the engagement regions protruding from a side facing the central opening toward the central opening, partially with respect to a direction along the longitudinal direction, and the engagement regions are bent and disposed along the inner surface of the cuff, making the flexible substrate engage with the cuff.

The "flexible substrate" means a substrate having flexibility.

In the sphygmomanometer according to this one embodiment, the light projecting unit can be disposed along the edge portions of the cuff with a simple configuration. Moreover, in an assembly process of the sphygmomanometer, an engagement state in which the flexible substrate engages with the cuff can be made by the engagement regions of the flexible substrate. As a result, the flexible substrate is easily positioned with respect to the blood pressure measuring cuff. Therefore, the assembly is facilitated.

The sphygmomanometer according to one embodiment further comprises a rectangular flexible substrate disposed along the inner surface of the cuff, wherein end side regions on both sides in the width direction of the flexible substrate protrude outward in the width direction from the edge portions on the both sides of the cuff, respectively, the light projecting unit is disposed along the edge portions of the cuff by being mounted on the end side regions of the flexible substrate, and the light receiving unit is disposed along the specific portion facing the target region by being mounted in an internal region between the end side regions of the flexible substrate.

In the sphygmomanometer according to this one embodiment, since the light projecting unit and the light receiving unit are mounted on one (common) flexible substrate, with a simple configuration, the light projecting unit can be disposed along the edge portion of the cuff, and the light receiving unit can be disposed along the specific portion facing the target region. Moreover, when the flexible substrate is attached to the blood pressure measuring cuff in the assembly process of the sphygmomanometer, the light projecting unit and the light receiving unit are simultaneously attached. Therefore, the assembly is facilitated.

In the sphygmomanometer according to one embodiment, the flexible substrate includes a pair of slits that allows the cuff to pass through at portions corresponding, in a direction along the longitudinal direction of the cuff, to both sides of a mounting region where the light projecting unit and the light receiving unit are mounted, and the cuff is configured to be worn around the site to be measured in the circumferential direction in a state in which the specific portion overlaps a back surface side of the mounting region of the flexible substrate and the cuff extends from the back surface side to a side facing the site to be measured through the pair of slits, respectively.

Typically, with respect to a direction along the width direction of the cuff, a dimension of each of the "slits" is set to be slightly larger than a dimension of the cuff in the width direction.

The "back surface side" of the flexible substrate means a side opposite to a side facing the site to be measured.

In the sphygmomanometer according to this one embodiment, the flexible substrate includes the pair of slits for passing the cuff through at the portions corresponding, in the direction along the longitudinal direction of the cuff, to both sides of the mounting region where the light projecting unit and the light receiving unit are mounted. In the assembly process of the sphygmomanometer, the cuff is made in a state in which the specific portion overlaps the back surface side of the mounting region of the flexible substrate and the cuff extends from the back surface side to a side facing the site to be measured through the pair of slits. As a result, an engagement state in which the flexible substrate is engaged with the cuff is obtained. As a result, the flexible substrate is easily positioned with respect to the blood pressure measuring cuff. Therefore, the assembly is facilitated.

The sphygmomanometer according to one embodiment further comprises a main body integrally attached to a side of an outer surface of the cuff, wherein the main body is equipped with:
the authentication unit;

a pressure control unit that performs control to supply a fluid to the cuff to pressurize the cuff or discharge the fluid from the cuff to depressurize the cuff;

a pressure detection unit that detects a pressure of the cuff; and a blood pressure calculation unit that calculates a blood pressure based on an output of the pressure detection unit.

In the sphygmomanometer according to this one embodiment, in the worn state, the pressure control unit mounted on the main body performs control to supply a fluid to the cuff to pressurize the cuff or discharge the fluid from the cuff to depressurize the cuff. In the pressurization process or the depressurization process for the cuff, the pressure detection unit detects the pressure of the cuff. The blood pressure calculation unit calculates a blood pressure based on an output of the pressure detection unit. As a result, the blood pressure can be accurately calculated. Furthermore, in this sphygmomanometer, the main body is integrally attached to the cuff on a side opposite to the site to be measured. Therefore, this sphygmomanometer can be configured more compact than, for example, a tabletop sphygmomanometer (a sphygmomanometer of a type in which a main body is provided apart from a blood pressure measuring cuff and is connected to a fluid bag of the cuff so as to be capable of flowing a fluid through a flexible tube). Furthermore, in this sphygmomanometer, a length of a wiring connecting the light projecting unit and the light receiving unit to the main body may be relatively short, and the reliability of the wiring can be enhanced.

As is clear from the above, according to the sphygmomanometer of the present disclosure, the vein authentication can be performed, and the blood pressure can be accurately measured.

The above embodiments are illustrative, and are modifiable in a variety of ways without departing from the scope of this invention. It is to be noted that the various embodiments described above can be appreciated individually within each embodiment, but the embodiments can be combined together. It is also to be noted that the various features in different embodiments can be appreciated individually by its own, but the features in different embodiments can be combined.

The invention claimed is:

1. A sphygmomanometer having a function of performing vein authentication on a subject, the sphygmomanometer comprising:
   a blood pressure measuring cuff extending in a longitudinal direction in a belt-like shape and configured to be worn around a rod-shaped site to be measured of a subject in a circumferential direction so as to cover a target region of the site to be measured where veins are present;
   a light projecting unit that is, in a plane where the cuff spreads, disposed along an edge portion on one side or edge portions on both sides of the cuff in a width direction perpendicular to the longitudinal direction, and irradiates a periphery of the target region of the site to be measured with light;
   a light receiving unit that is provided in a sheet shape along a specific portion of an inner surface of the cuff, the specific portion facing the target region, and receives the light scattered or reflected by the target region to obtain an image including a vein pattern of the target region; and
   an authentication unit that compares the vein pattern included in the image with a reference vein pattern registered in advance and performs vein authentication on the subject.

2. The sphygmomanometer according to claim 1, wherein the light receiving unit includes:
   a sheet-shaped image pick-up element disposed along the specific portion of the inner surface of the cuff; and
   a sheet-shaped image forming element disposed along a surface of the image pick-up element on a side facing the target region,
   the image forming element allows the light to transmit in one direction perpendicular to a plane on which the image forming element extends, and blocks the light in a direction other than the one direction, and
   the image pick-up element receives light transmitted through the image forming element, and outputs an electric signal representing an image including the vein pattern of the target region.

3. The sphygmomanometer according to claim 1, further comprising an attachment member disposed along an outer surface of the cuff,
   wherein end side regions on both sides in the width direction of the attachment member protrude outward in the width direction from the edge portions on the both sides of the cuff, respectively, and
   the light projecting unit is disposed along the edge portions of the cuff by being mounted on the end side regions of the attachment member.

4. The sphygmomanometer according to claim 3, wherein the attachment member is a rectangular frame-shaped flexible substrate surrounding a central opening,
   the end side regions of the flexible substrate have engagement regions, each of the engagement regions protruding from a side facing the central opening toward the central opening, partially with respect to a direction along the longitudinal direction, and
   the engagement regions are bent and disposed along the inner surface of the cuff, making the flexible substrate engage with the cuff.

5. The sphygmomanometer according to claim 1, further comprising a rectangular flexible substrate disposed along the inner surface of the cuff,
   wherein end side regions on both sides in the width direction of the flexible substrate protrude outward in the width direction from the edge portions on the both sides of the cuff, respectively,
   the light projecting unit is disposed along the edge portions of the cuff by being mounted on the end side regions of the flexible substrate, and
   the light receiving unit is disposed along the specific portion facing the target region by being mounted in an internal region between the end side regions of the flexible substrate.

6. The sphygmomanometer according to claim 5, wherein the flexible substrate includes a pair of slits that allows the cuff to pass through at portions corresponding, in a direction along the longitudinal direction of the cuff, to both sides of a mounting region where the light projecting unit and the light receiving unit are mounted, and
   the cuff is configured to be worn around the site to be measured in the circumferential direction in a state in which the specific portion overlaps a back surface side of the mounting region of the flexible substrate and the cuff extends from the back surface side to a side facing the site to be measured through the pair of slits, respectively.

7. The sphygmomanometer according to claim 1, further comprising a main body integrally attached to a side of an outer surface of the cuff,
wherein the main body is equipped with:
the authentication unit;
a pressure control unit that performs control to supply a fluid to the cuff to pressurize the cuff or discharge the fluid from the cuff to depressurize the cuff;
a pressure detection unit that detects a pressure of the cuff; and
a blood pressure calculation unit that calculates a blood pressure based on an output of the pressure detection unit.

* * * * *